INVENTOR.
Edmund F. Schweller
and Richard S. Gaugler
By Willits Hardman and Fehr
Attorneys INVENTOR.
Edmund F. Schweller
and Richard S. Gaugler
Attorneys INVENTOR.
Edmund F. Schweller
and Richard S. Gaugler
Attorneys March 16, 1954   E. F. SCHWELLER ET AL   2,672,019
TWO-TEMPERATURE REFRIGERATING APPARATUS
Filed April 28, 1951   5 Sheets—Sheet 5

INVENTOR.
Edmund F. Schweller
and Richard S. Gaugler
By Willits, Hardman and Zehe
Attorneys Patented Mar. 16, 1954

2,672,019

UNITED STATES PATENT OFFICE 2,672,019

TWO-TEMPERATURE REFRIGERATING APPARATUS

Edmund F. Schweller and Richard S. Gaugler, Oakwood, Ohio, assignors to General Motors Corporation, Dayton, Ohio, a corporation of Delaware Application April 28, 1951, Serial No. 223,532

4 Claims. (Cl. 62—4)

This invention relates to refrigerating apparatus.

An object of this invention is to provide an improved mechanical refrigerator having a very low temperature box-shaped frozen food compartment adapted to receive frozen food packages and also a box-shaped unfrozen food compartment to be maintained at a set refrigerating temperature above 32° F. In one portion of the unfrozen food compartment there is a space provided in which relatively high humidities are maintained for preserving foods which are likely otherwise to become dehydrated. However, the major portion of the unfrozen food compartment is maintained at lower humidities and is adapted to be used for foods in containers which protect their foods from dehydration.

Notwithstanding these advantages, the refrigerator is adapted to operate satisfactorily in varying atmospheric temperatures from 70° F. to 110° F. It is also adapted to operate satisfactorily in varying degrees of atmospheric humidity, without the danger of accumulating undesirable moisture within the insulation surrounding the compartments or in the portion of the food compartment provided for foods in containers. To this end the cabinet is provided with an outer casing which is substantially hermetically sealed throughout and is engaged by the door construction in a manner to reduce the infiltration of outside air into the refrigerator.

The frozen food compartment is enclosed within a box-shaped container, the walls of which are provided with a freezing evaporator. The inner surface of the container is made smooth to receive the frozen food packages and any frost collecting therein may be easily scraped off since it does not adhere firmly at the low temperatures prevailing therein. Because the frost accumulates so slowly, this compartment may be maintained at these temperatures without defrosting for relatively long periods of time (at least several months). The insulation around the frozen food compartment is made of hermetically sealed bags containing glass or mineral wool with the surfaces of the bags pressed so closely against the outer surfaces of the frozen food compartment container and the freezing evaporator that it substantially blocks all access of moisture thereto so that only a slight amount of frost can ever gather on the outer surface of the frozen food compartment container and its freezing evaporator. No moisture can enter the sealed bags because of the moisture impermeable nature of their material.

The unfrozen food compartment liner is also surrounded by similar bags of insulation pressed against the outer surfaces of the liner so that substantially no moisture can gather on these walls. The lower portion of the unfrozen food compartment liner is surrounded and contacted by a refrigerant pan cooling evaporator which is in closed secondary refrigerant circuit relationship with a condenser in heat exchange relation with the frozen food compartment. This space in the lower part of the unfrozen food compartment is provided with one or more covered moisture retaining food receiving pans or drawers adapted to maintain a space at relatively low temperature and high humidity for storing clean vegetables. The refrigerant pan cooling evaporator may be extended into contact with the other portions of the outer surfaces of the liner for the unfrozen food compartment to provide additional refrigeration.

Many users dislike moisture on containers placed in the food compartment of refrigerators. Since it is unnecessary that high humidities be maintained for such food articles, we have provided a third refrigerant evaporating means maintained upon a frosting and defrosting cycle in accordance with the operating and idle periods of the refrigerating systems which provide refrigeration for the frozen food compartment. This frosting and defrosting evaporator is placed directly in the upper portion of the unfrozen food compartment near the rear wall thereof. By maintaining this evaporator on a frosting and defrosting cycle some of the moisture vapor in the unfrozen food compartment is condensed out of the atmosphere therein. This causes a migration of moisture from the insulation space surrounding the frozen food compartment to this frosting and defrosting evaporator since the moisture vapor is blocked from access to the colder freezing evaporator upon the walls of the frozen food compartment container. Through this formation of frost and defrosting, upon this evaporator there is a substantially continuous removal of vapor when the humidity is high both from the interior of the food compartment and the space surrounding the liner so as to prevent any material accumulation or excess of moisture in either place.

A motor compressor unit and condenser are placed in the lower part of the refrigerator and are in refrigerant flow relationship with the freezing evaporator. The compressor is cycled frequently to maintain the desired temperature conditions in the refrigerator and this is accomplished by providing a thermostatic switch having its thermostat bulb mounted upon the frozen food compartment container closely adjacent the one portion of the freezing evaporator.

This refrigerator is adapted to maintain a frozen food compartment substantially below 32° F. without defrosting for long periods of time, such as several months, by a normal cycling of the motor compressor unit which may occur as often as several times an hour. The frosting and defrosting evaporator, which is the only other evaporator in the refrigerator, frosts during each operating period and defrosts automatically every time the motor compressor unit is idle during the normal cycling of the motor compressor unit. The refrigerator can operate at high efficiency in all sections of the United States under varying conditions providing extreme atmospheric temperature and humidity variations without becoming frost or moisture bound either within its food preserving compartment or within its insulation spaces.

Further objects and advantages of the present invention will be apparent from the following description, reference being had to the accompanying drawings, wherein a preferred form of the present invention is clearly shown.

Figure 1:
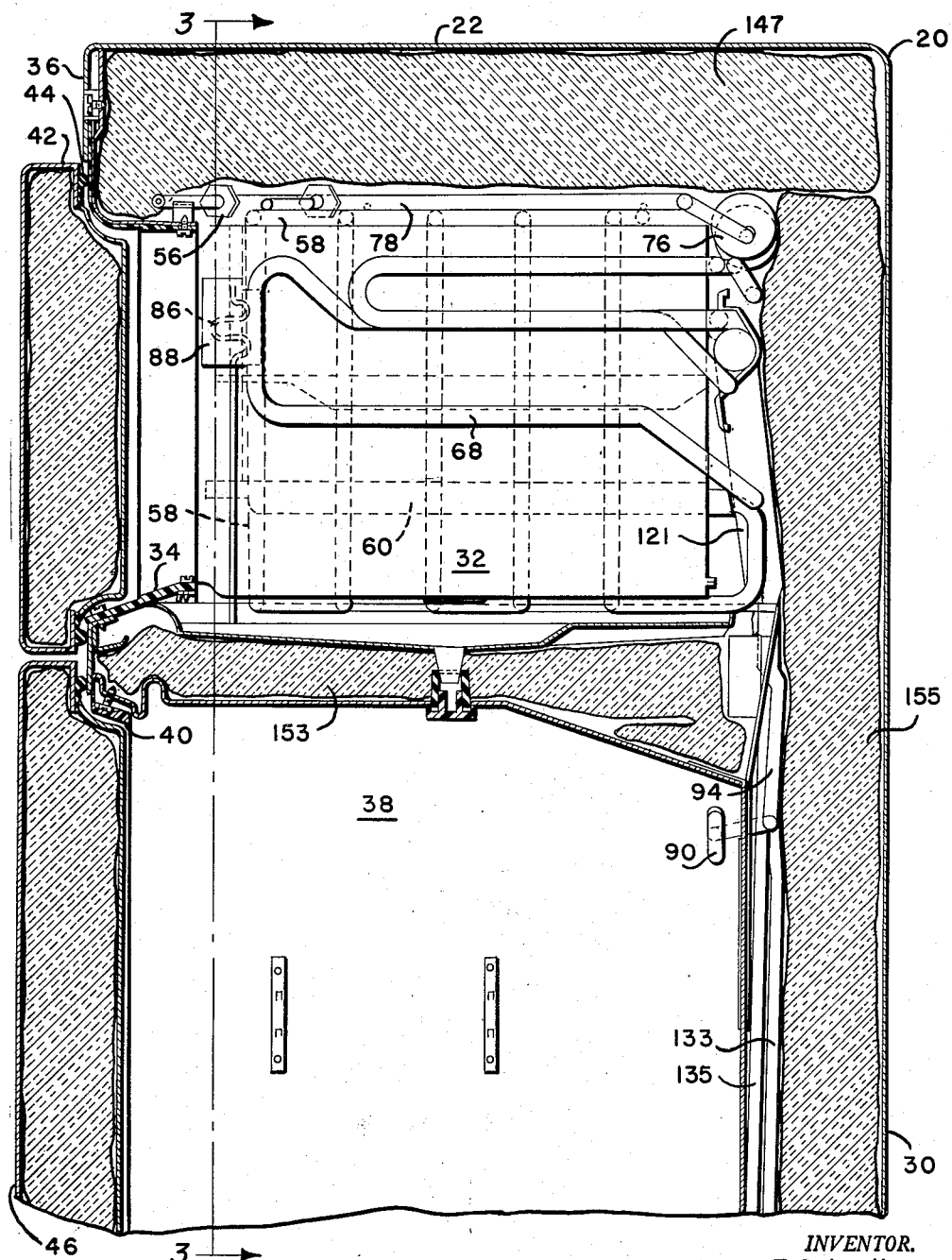
Fig. 1 is a vertical sectional view with the side insulation removed, taken substantially along the line 1—1 of Fig. 3 of the upper portion of a two temperature refrigerator embodying one form of my invention.
Figure 2:
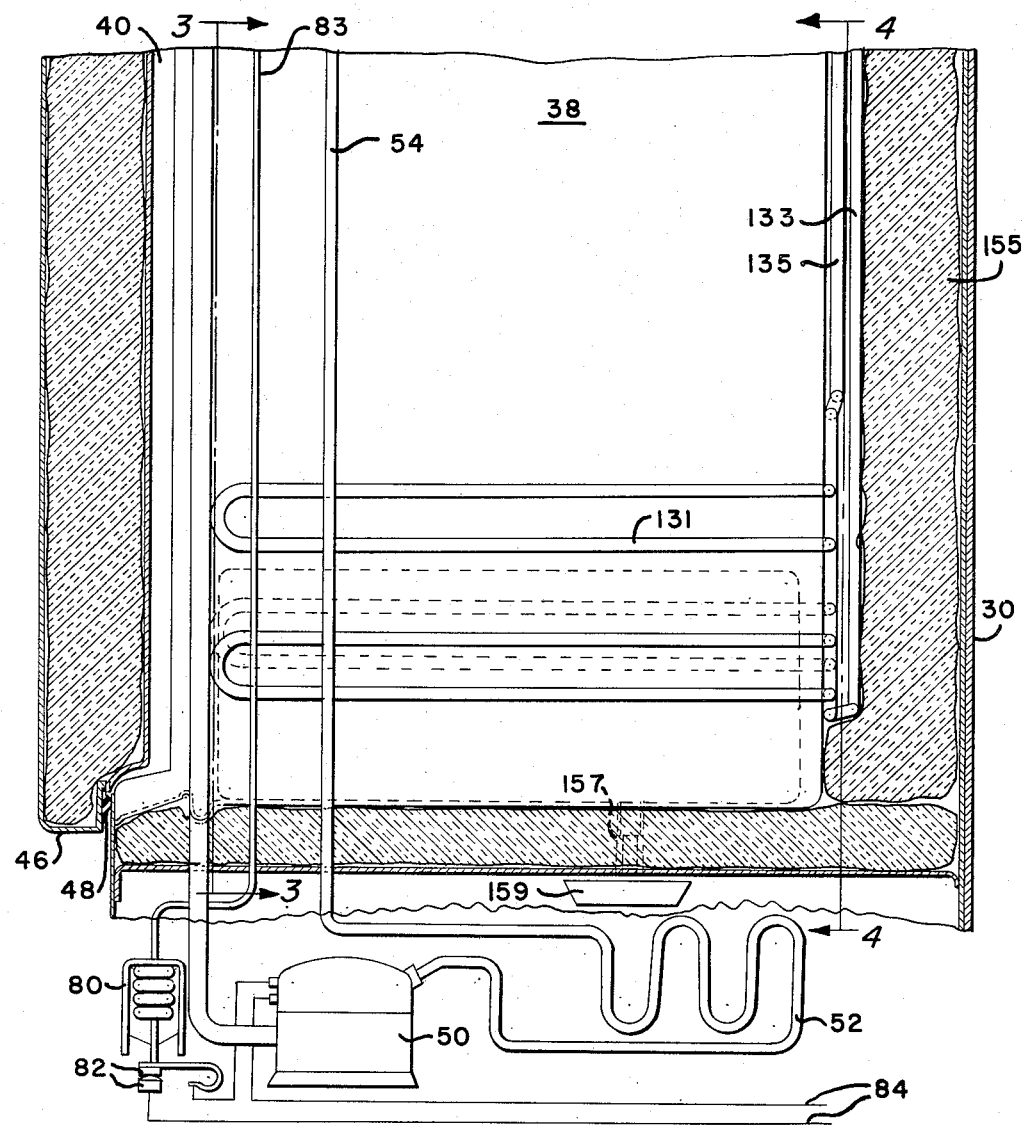
Fig. 2 is a vertical sectional view with the side insulation removed taken substantially along the line 2—2 of Fig. 3 of the bottom portion of the two temperature refrigerator, the upper portion of which is shown in Fig. 1.
Figure 3:
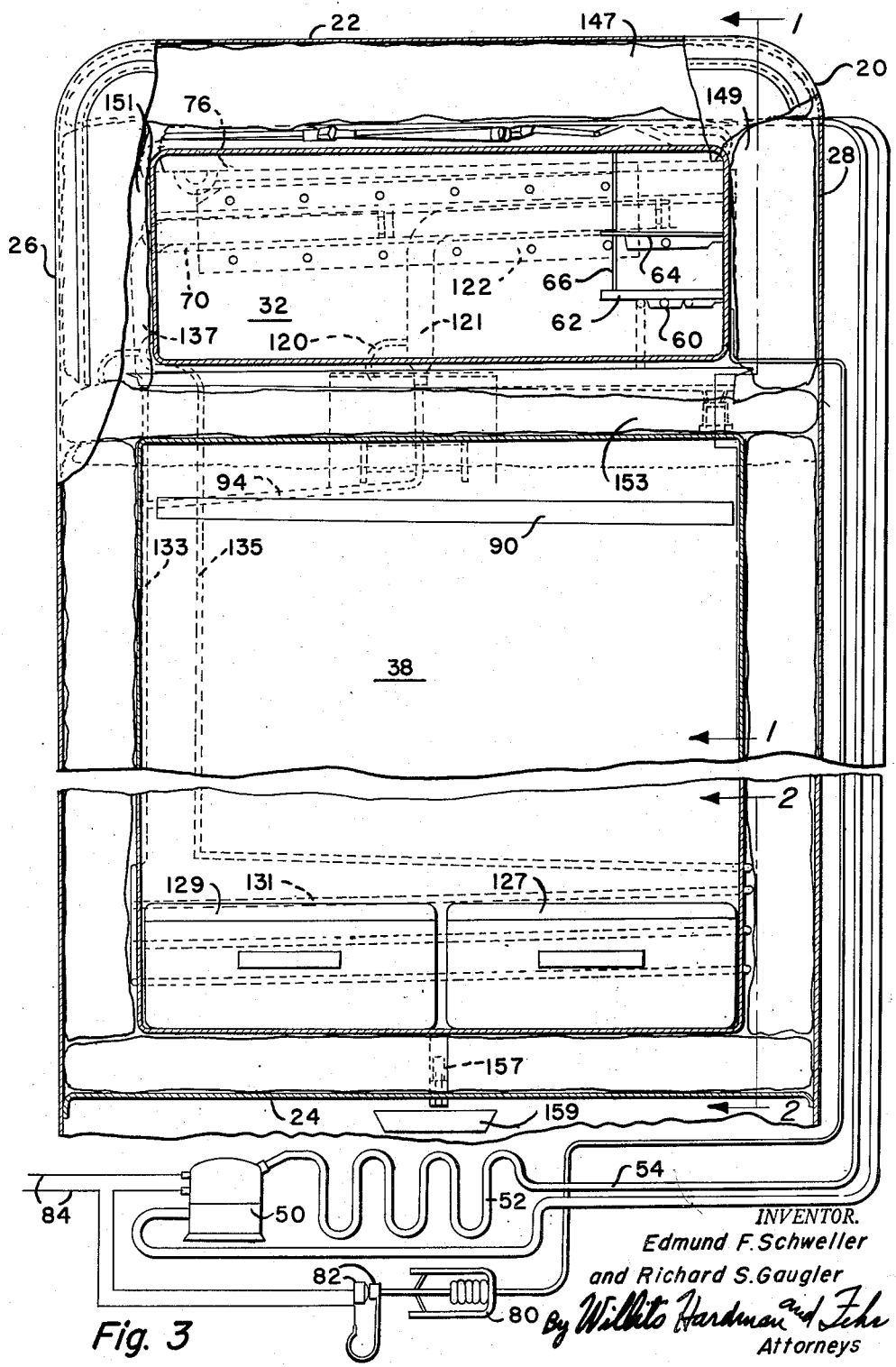
Fig. 3 is a fragmentary vertical front sectional view taken subsantially along the line 3—3 of Figs. 1 and 2.
Figure 4:
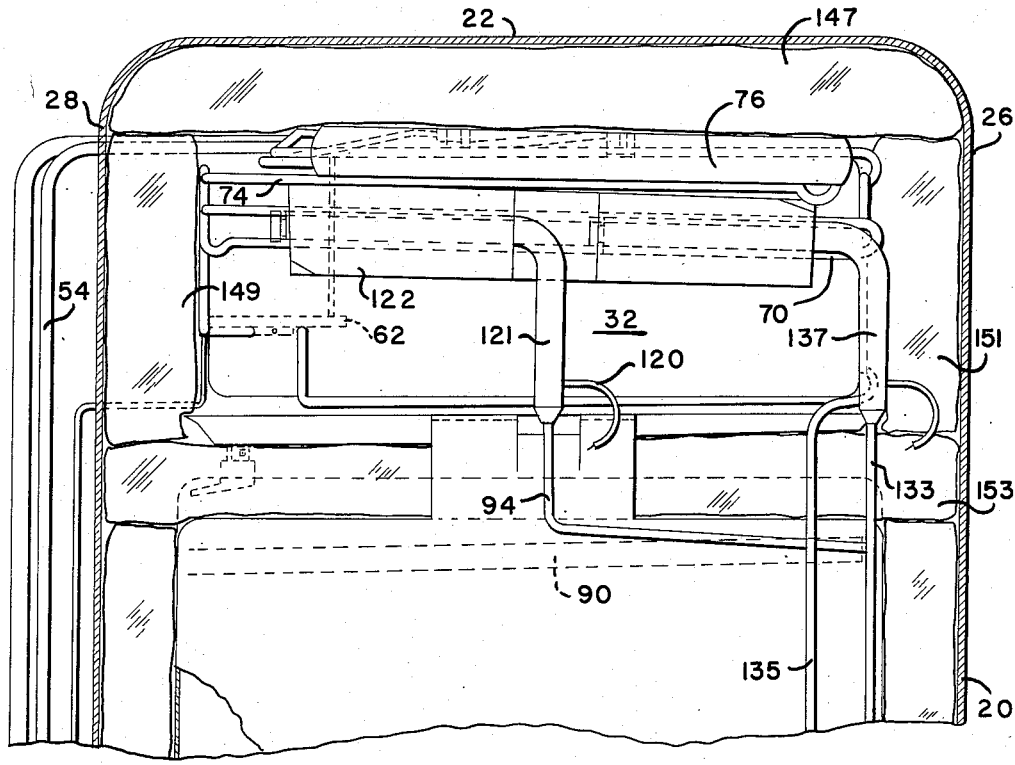
Fig. 4 is a fragmentary rear vertical sectional view with the back insulation removed taken substantially along the line 4—4 of Figs. 1 and 2.
Figure 4:
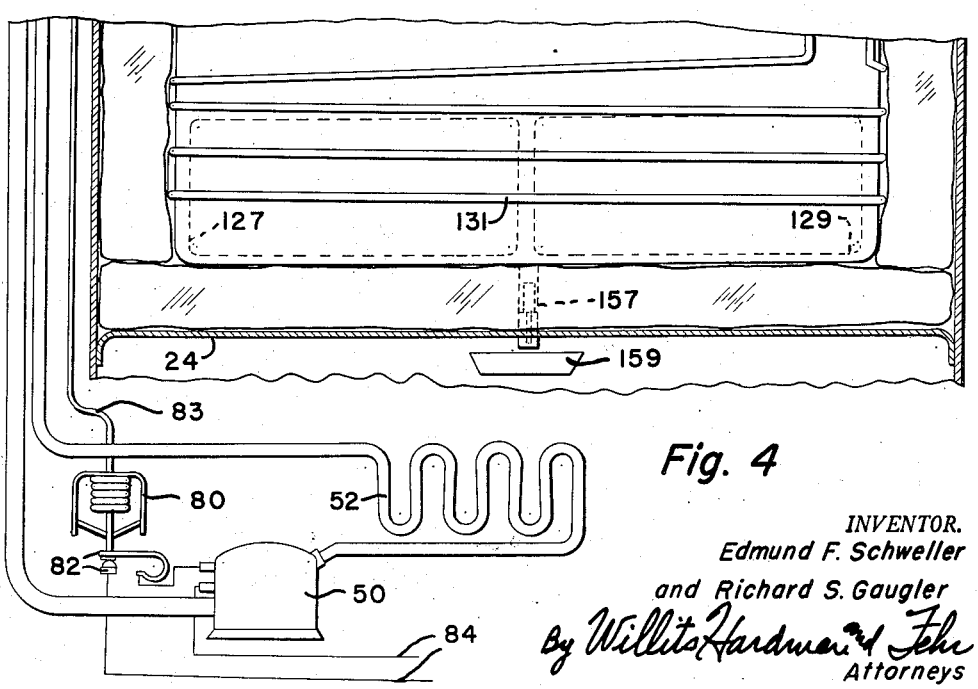
Figure 6:
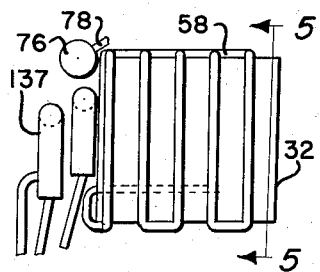
Fig. 6 is an exploded left side view of the freezing compartment and evaporator shown in Fig. 5 including the two secondary condensers and the accumulator.
Figure 5:
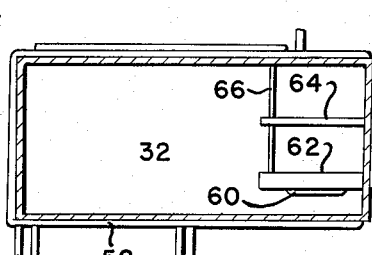
Fig. 5 is a front sectional view partly diagrammatical along the line 5—5 of Figs. 6 and 7 of the freezing compartment and the freezing evaporator.
Figure 7:
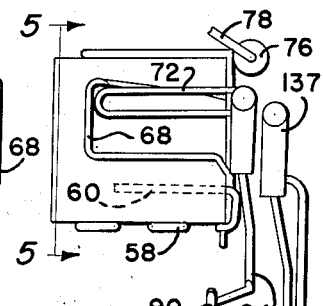
Fig. 7 is an exploded right side view of the freezing compartment shown in Fig. 5 with the secondary cooling coils for the high humidity compartment and the frosting and defrosting evaporator being added.
Figure 9:
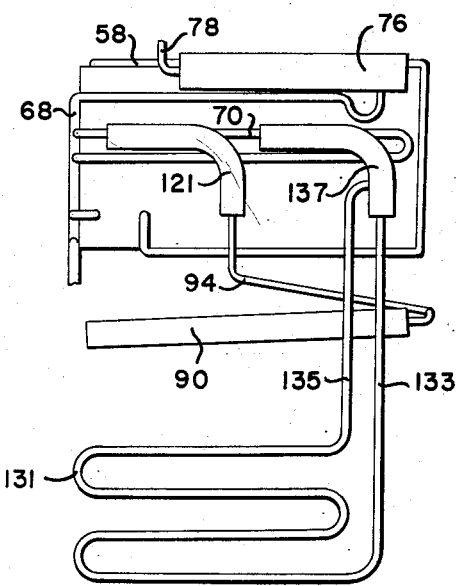
Fig. 9 is a back view of the freezing compartment and the other two evaporators.
Figure 8:
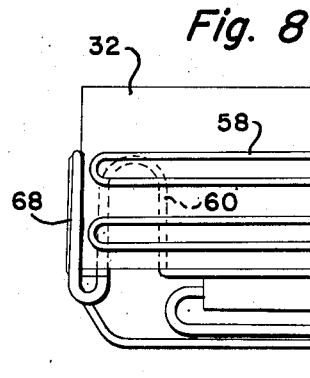
Fig. 8 is a bottom view of the freezing compartment shown in Fig. 5.

Referring now to the drawings, there is provided an outer sheet metal cabinet shell 20 enclosing the top 22, bottom 24, sides 26 and 28 and rear 30 of the cabinet which is hermetically sealed. The joints of this shell are sealed by welding or other suitable metal seal and preferably are double sealed on the interior by the use of some form of non-metallic sealing material such as an asphalt applied in molted form.

There is provided a freezing compartment 32 in the upper portion of the cabinet in the form of a box-shaped metal container having its front side open. This freezing compartment container 32 has its front edges connected by a member 34 of a thermoplastic material called a breaker strip or throat, to the front portion 36 of the outer shell 20 of the refrigerator. Beneath the freezing compartment container 32 there is provided a food compartment 38 in the form of a box-shaped metal container or liner having its front side open. The front edges of this box-shaped container 38 forming the food compartment, are connected by breaker strip or throat 40 of a thermoplastic or other suitable poor heat conducting material with the front wall 36 of the outer shell 20. A separate upper door 42 containing insulation is provided for the freezing compartment 32 and is provided with a seal 44 of a suitable synthetic rubber which extends entirely around the door 42 to make sealing engagement with the front 36 of the outer cabinet shell 20 so that when the door 42 is closed the freezing compartment 32 is substantially sealed from outside air. The lower food compartment 38 is provided with a separate door 46 containing somewhat less insulation than the door 42. It is likewise provided with a similar seal 48 extending entirely around the door which makes sealing engagement with the front 36 of the outer shell 20. This seals the food compartment 38 from the outside air. The sealing of the doors 42 and 46 against the front side 36 of the outer shell 20 completes the hermetical sealing of the outside of the cabinet so that no air and moisture can enter the cabinet except by opening one of the doors.

The freezing compartment 32 is provided with smooth surfaces inner walls so that any snow or frost accumulating therein can be easily scraped or brushed off. When no melting occurs, such snow and frost will not adhere tightly to the surface of the freezing compartment 32. The freezing compartment 32 is cooled by a primary refrigerating system which includes a sealed motor compressor unit 50 which delivers compressed refrigerant to a condenser 52 both of which are located in a machine compartment beneath the bottom wall 24 of the cabinet.

The condenser 52 delivers liquid refrigerant through a capillary tube restrictor 54 to the inlet connection 56 of a tubular evaporator which includes a section of serpentine tubing 58 wound in serpentine fashion over the top, left side, and bottom of the freezing compartment 32 after which there is a refrigerated loop 60 extending through the back wall of the compartment 32 forwardly, beneath, and in contact with the bottom of the ice tray shelf 62 for providing for fast freezing of ice in an ice tray. The shelf 62 is beneath another shelf 64, both of which are supported upon the side wall and by a connection 66 from the top of the freezing compartment container 32. From the loop 60, the evaporator tubing extends in the form of a loop 68 upon the right side wall of the freezing compartment container 32. The evaporator tubing then extends in the form of a loop 70 across the back wall of the freezing compartment container 32, after which there is another loop 72 provided on the right side wall of the freezing compartment container 32 which connects with a conenction 74 across the back wall of the freezing compartment container 32 which ends in a trap connecting to the bottom of an accumulator or tank 76 located in contact with the upper rear edge of the freezing compartment container 32. The upper portion of the accumulator 76 is connected by the suction conduit 78 with the inlet of the compressor 50.

A thermostatic control switch 80 is provided and disclosed in diagrammatic form. It includes contacts 82 connected in series with one of the supply conductors 83 which conduct electrical energy to the motor compressor unit 50. Preferably, this switch is of the type shown in the Grooms Patent No. 2,351,038 and has a temperature sensitive element in the form of a capillary tube 84 which ends in a serpentine portion 86 clamped by a clamp 88 to the right side wall of the freezing compartment container 32 in direct intimate thermal contact with the vertical portion of the refrigerant evaporator loop 68. The thermostat 80 is set to close at about plus 12° F. and to open at about minus 4° F. to maintain an average temperature near 0° F.

In prior refrigerators of this general type, it has been customary to cool the food compartment 38 entirely by a secondary evaporating means wrapped around the walls of the liner of the food comparament. This resulted in very high humidity within the food compartment. This high humidity was objected to by many users. Since there was no way of providing a perfect seal between the interior of the food compartment 38 and the insulation space surrounding the food compartment 38 there was a tendency for the moisture to be carried to the coldest adjacent point. This caused moisture vapor diffusing into the insulation space to condense on the secondary evaporator tubing on the outer surface of the food compartment liner and some of this moisture collected in the bottom of the insulation space.

To overcome this objectionable circumstance we provide a long slightly inclined flattened tubular refrigerant evaporator 90 within the food compartment 38. This is supported adjacent to the rear wall of the cabinet near the upper portion thereof leaving a small space between the tubular evaporator 90 and the rear wall of the cabinet to permit air to flow downwardly therebetween. The upper end of this tubular evaporator 90 is connected by tubing 94 to the bottom of a bent condenser 121. This condenser 121 is clamped in contact with the upper portion of the refrigerant evaporator loop 70 on the back wall of the freezing compartment 32. The condenser 121 is provided with a charging tube 120 through which may be charged this entire secondary circuit including the tube 94 and the tubular evaporator 90. The loop 70 on the back wall of the freezing compartment 32, with which the condenser 121 is in contact and thermal exchange, is somewhat warmer than other portions of the primary evaporator. To set the temperature of the tubular evaporator 90 at the proper value to reduce the humidity within the food compartment 38, the condenser 121 is charged with an inert gas in addition to the refrigerant to maintain a temperature differential between the condenser 121 and the tubular evaporator 90 sufficient to cause the tubular evaporator 90 to reach a defrosting temperature during the idle period of the motor compressor unit 50. As an example, the tubular evaporator 90 may be formed of flattened ¾" tubing 25½" long and charged with 0.15 lb. of difluorodichloromethane and 25 c.c. of nitrogen. This makes it possible for the tubular evaporator 90 to collect frost during the running period of the motor compressor unit 90 at a temperature as low as 28° F. and to defrost automatically when its temperature rises to 32° F. during the idle period as shown by the chart constituting Fig. 10. This automatically keeps the humidity within the food compartment 38 sufficiently low to avoid objection from users. These variations in temperature of the tubular evaporator 90 during normal operation are due to the variations in temperature of the primary evaporator due to the cycling of the motor compressor unit under the control of the switch 80.

Figure 10:
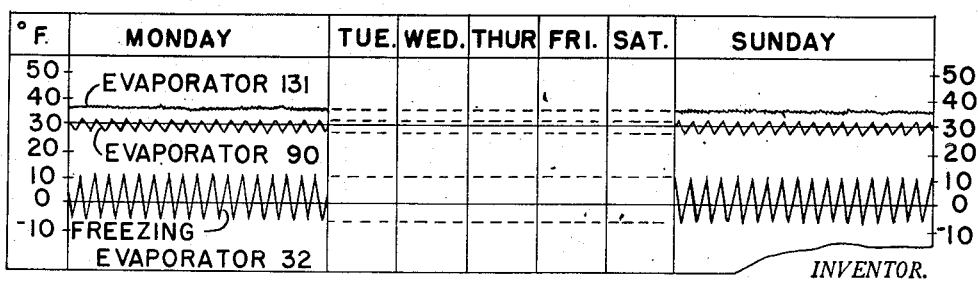
Fig. 10 is a temperature time chart of the three evaporators in the cabinet.

The bottom of the food compartment is provided with two covered pans 127 and 129 to keep food at a high humidity. These pans 127 and 129 are conveniently arranged to pull out as drawers. Since these pans are substantially closed it is necessary to provide additional cooling so that the food within these pans is kept at a suitable refrigerating temperature. For this purpose there is wrapped about the sides and back of the liner for the food compartment 38 in serpentine fashion, the tubing 131 which constitutes the evaporator of another secondary refrigerant circuit which includes the connecting conduits 133 and 135 which are connected to the bent secondary condenser 137 which is clamped along with the condenser 121 to the loop 70 upon the rear wall of the freezing compartment container 32 by a clamping plate 139. The tubing 131 may be extended over as much of the outer surface of the food compartment liner 38 as may be necessary to keep the food compartment at proper temperatures. The secondary condenser 137 condenses refrigeration at a sufficient rate to provide sufficient evaporation of the refrigerant in the evaporator tubing 131 to keep the adjacent portions of the food compartment liner 38 at a temperature between about 34° and 36° F. as shown in Fig. 10.

Occasionally, it may be desired to shut down the refrigerating system or to defrost the freezing compartment container 32. To make this easier there is provided a drain (not shown) from the freezing container 32 to a catch pan 141 beneath it.

Moisture vapor tends to migrate to the coldest surface to which it has access. If the insulation spaces between the food compartment liner 38 and the freezing compartment container 32 within the outer shell 20 were filled with ordinary mineral or glass wool in a substantially homogeneous arrangement without any moisture vapor barriers, the moisture vapor would all tend to collect in the form of frost or snow upon the external surface of the primary evaporator surrounding the freezing compartment container 32. Since it is impossible to prevent all collection of such moisture vapor upon the primary evaporator the catch pan 141 is located directly beneath the primary evaporator 32 so that if the refrigerator should ever be out of action for a sufficient length of time to cause the primary evaporator surrounding the freezing compartment container to rise above 32° F., any frost melting from its outer surfaces will be caught by the catch pan 141. This catch pan 141 is provided with a drain outlet 143 which extends into the food compartment 38 and is provided with a spout 145 for discharging the defrosting water onto the vertical side wall of the food compartment liner 38.

However, to keep to a minimum the amount of frost collecting upon this primary evaporator surrounding the freezing compartment container, we have placed the insulation such as glass or mineral wool into sealed bags of some suitable thermoplastic material such as polyethylene or polyvinylidene chloride. Such materials are substantially moisture impermeable and prevent substantially any leakage of moisture vapor into the interior of the bag containing the glass or mineral wool. These bags, such as a bag 147 in the space above the freezing compartment 32 and the bags 149 and 151 in the spaces at the sides of the freezing compartment container 32 and the bag 153 between the catch pan 141 and the top of the food compartment liner 38 as well as the bag 155 which fills the insulation space at the rear wall of the cabinet closely envelop the freezing compartment container 32 and the evaporator tubing surrounding it so that the access of moisture to these cold surfaces is blocked so well that substantially no moisture can get to this surface. The material forming the bags is very flexible and resilient and the glass or mineral wool used inside these bags is likewise very flexible and resilient so that the bags hug and surround the freezing container 32 and the primary evaporator surrounding it very closely, so that access to these surfaces through the insulation space is almost completely blocked.

Since the moisture vapor is prevented from having access to the coldest surface in the refrigerator cabinet, the vapor then migrates to the next coldest surface which is the surface of the tubular evaporator 98 which is normally kept at a temperature varying between about 28° F. and 32° F. as shown by the chart in Fig. 10. This migration is sufficient to prevent moisture from condensing on the evaporator coils 131 of the other secondary evaporator. This expedient therefore keeps the insulation space surrounding the food compartment liner 38 substantially dry. However, as an added precaution, these insulation spaces are likewise filled with mineral or glass wool in the sealed bags 163, 165 and 167 as described for the bags surrounding the freezing compartment container 32.

When the tubular evaporator 98 defrosts, the water forming as a result of the melting of the frost drops to the bottom of the food compartment liner 38. Any water upon the bottom of the food compartment liner 38 is conducted by a drain 157 to a pan 159 in the machine compartment 161. Here the pan 159 will be heated sufficiently by its proximity to the motor compressor 50 and condenser 52 then the moisture will be evaporated therefrom.

This application is related to application S. N. 223,531 filed concurrently herewith.

While the form of embodiment of the invention as herein disclosed constitutes a preferred form, it is to be understood that other forms might be adopted, as may come within the scope of the claims which follow.

What is claimed is as follows:

1. Refrigerating apparatus comprising an insulated cabinet containing a frozen food compartment and a separate unfrozen food compartment thermally isolated from the frozen food compartment, said unfrozen food compartment being enclosed by a liner, refrigerating means for cooling the walls of said liner at a temperature above freezing and for cooling said frozen food compartment to a temperature well below freezing, a secondary refrigerant circuit having a condensing portion in contact with the refrigerating means for the frozen food compartment and having an evaporating means directly within the unfrozen food compartment maintained at a temperature below the temperature of the walls of said liner, and means providing a substantial moisture vapor barrier between the walls of said liner and the frozen food compartment and the refrigerating means for said frozen food compartment and in the insulation surrounding the frozen food compartment thereby causing the migration of moisture vapor in and about the food compartment to the evaporating means of said secondary circuit.

2. Refrigerating apparatus comprising an insulated cabinet containing a frozen food compartment and a separate unfrozen food compartment thermally isolated from the frozen food compartment, said unfrozen food compartment being enclosed by a liner, refrigerating means for cooling the walls of said liner at a temperature above freezing and for cooling said frozen food compartment to a temperature well below freezing, a secondary refrigerant circuit having a condensing portion in heat exchange relation with the refrigerating means for the frozen food compartment and having an evaporating means directly within the unfrozen food compartment maintained at a temperature below the temperature of the walls of said liner, and means providing a substantial moisture vapor barrier between the walls of said liner and the frozen food compartment and the refrigerating means for said frozen food compartment and in the insulation surrounding the frozen food compartment thereby causing the migration of moisture vapor in and about the food compartment to the evaporating means of said secondary circuit, a cycling control means for said refrigerating means for retarding the refrigeration of said frozen food compartment when it reaches a predetermined low limit and for increasing the refrigeration of said frozen food compartment when it reaches a predetermined high limit, said secondary circuit being charged with an amount of an inert gas in addition to the refrigerant just sufficient to bring the evaporating means to frost melting temperatures during one portion of the cycle of the refrigerating means and to freezing temperatures during another portion of the cycle of the refrigerating means.

3. Refrigerating apparatus including a cabinet having a hermetically sealed outer shell, a freezing compartment container provided with freezing evaporating means for maintaining the freezing compartment at temperatures substantially below 32° F., a food compartment liner provided with refrigerant evaporating means maintained above 32° F. upon its external surface to provide a portion of the cooling of the food compartment, insulation in the form of sealed bags of a flexible substantially moisture impermeable material containing a flexible insulating material packed in the space between the freezing compartment container and the inner liner and the outer shell hugging the freezing evaporating means so closely so as to substantially block the access of moisture thereto, a third evaporating means located directly within the food compartment liner for reducing the humidity therein and for drawing moisture vapor from the exterior of the liner, means for causing refrigerant to evaporate within each of said evaporating means for maintaining said temperatures, and cycling control means for controlling said evaporation to maintain said freezing compartment substantially below 32° F. and to maintain said food compartment at satisfactory refrigerating temperatures above 32° F. and for operating said third evaporating means upon a frosting and defrosting cycle to limit the humidity in said food compartment.

4. Refrigerating apparatus including a cabinet having a hermetically sealed outer shell, a freezing compartment container provided with freezing evaporating means for maintaining the freezing compartment at temperatures substantially below 32° F., a food compartment liner provided with refrigerant evaporating means maintained above 32° F. upon its external surface to provide a portion of the cooling of the food compartment, insulation in the form of sealed bags of a flexible substantially moisture impermeable material containing a flexible insulating material packed in the space between the freezing compartment container and the inner liner and the outer shell hugging the freezing evaporating means so closely so as to substantially block the access of moisture thereto, a third evaporating means located directly within the food compartment liner for reducing the humidity therein and for drawing moisture vapor from the exterior of the liner, means for causing refrigerant to evaporate within each of said evaporating means for maintaining said temperatures, and cycling control means for controlling said evaporation to maintain said freezing compartment substantially below 32° F. and to maintain said food compartment at satisfactory refrigerating temperatures above 32° F. and for operating said third evaporating means upon a frosting and defrosting cycle to limit the humidity in said food compartment, said third evaporating means being a portion of a secondary refrigerant circuit having a condensing portion in heat exchange relation with said freezing evaporating means, said secondary circuit being charged with an amount of refrigerant and another gas just sufficient to cause said third evaporating means to frost during one portion of the cycle of the cycling control means and to defrost during another portion of the cycle.

EDMUND F. SCHWELLER.
RICHARD S. GAUGLER.

References Cited in the file of this patent

UNITED STATES PATENTS

| Number | Name | Date |
|---|---|---|
| 2,033,554 | Smith | Mar. 10, 1936 |
| 2,076,277 | Reinhart | Apr. 6, 1937 |
| 2,136,316 | Philipp | Nov. 8, 1938 |
| 2,293,360 | Reilly et al. | Aug. 18, 1942 |
| 2,442,978 | Jones | June 8, 1948 |
| 2,487,182 | Richard | Nov. 8, 1949 |